United States Patent
Moniz et al.

(10) Patent No.: US 7,334,392 B2
(45) Date of Patent: Feb. 26, 2008

(54) COUNTER-ROTATING GAS TURBINE ENGINE AND METHOD OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

(*) Notice: Subject to any disclaimer, the term of this patent is extended or adjusted under 35 U.S.C. 154(b) by 504 days.

(21) Appl. No.: 10/977,075

(22) Filed: Oct. 29, 2004

(65) Prior Publication Data

US 2006/0090451 A1    May 4, 2006

(51) Int. Cl.
F02C 3/067    (2006.01)
F02K 3/04     (2006.01)

(52) U.S. Cl. ............... 60/204; 60/39.162; 60/226.1; 60/268

(58) Field of Classification Search ............. 60/39.162, 60/226.1, 268, 772, 774, 204
See application file for complete search history.

(56) References Cited

U.S. PATENT DOCUMENTS

| | | | |
|---|---|---|---|
| 4,909,031 A | * | 3/1990 | Grieb ............... 60/225 |
| 5,105,618 A | * | 4/1992 | Lardellier ............ 60/226.1 |
| 5,274,999 A | * | 1/1994 | Rohra et al. ......... 60/226.1 |
| 5,806,303 A | | 9/1998 | Johnson |
| 5,809,772 A | | 9/1998 | Giffin, III et al. |
| 5,813,214 A | | 9/1998 | Moniz et al. |
| 5,867,980 A | | 2/1999 | Bartos |
| 6,619,030 B1 | | 9/2003 | Seda et al. |
| 6,684,626 B1 | | 2/2004 | Orlando et al. |
| 6,711,887 B2 | | 3/2004 | Orlando et al. |
| 6,732,502 B2 | | 5/2004 | Seda et al. |
| 6,739,120 B2 | | 5/2004 | Moniz et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |

* cited by examiner

Primary Examiner—L. J. Casaregola
(74) Attorney, Agent, or Firm—William Scott Andes Armstrong Teasdale LLP

(57) ABSTRACT

A method for assembling a gas turbine engine includes providing a first fan assembly including a plurality of rotor blades that are configured to rotate in a first rotational direction at a first rotational speed, rotatably coupling a second fan assembly axially aft of the first fan assembly, wherein the second fan assembly includes a plurality of rotor blades that are configured to rotate in a second rotational direction, and coupling a gearbox to the second fan assembly that is configured to rotate the second fan assembly at a second rotational speed that is different than the first rotational speed.

15 Claims, 3 Drawing Sheets

COUNTER-ROTATING GAS TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least some known gas turbine engines include a forward fan, a core engine, and a power turbine. The core engine includes at least one compressor, a combustor, a high-pressure turbine, and a low-pressure turbine coupled together in a serial flow relationship. More specifically, the compressor and high-pressure turbine are coupled through a high-pressure shaft to define a high-pressure rotor. The compressor compresses air entering the core engine that is then mixed with fuel and ignited to form a high energy gas stream. The gas stream flows through the high-pressure turbine, rotatably driving it and the high-pressure shaft that, in turn, rotatably drives the compressor.

The gas stream is expanded as it flows through the low-pressure turbine. The low-pressure turbine rotatably drives the fan through a low-pressure shaft such that a low-pressure rotor is defined by the fan, the low-pressure shaft, and the low-pressure turbine. At least some known low pressure turbines include counter-rotating turbines that power counter-rotating fans and counter-rotating boosters and/or low pressure compressors.

When operating such counter-rotating turbines, torque is split substantially equally between the forward and aft fan shafts to facilitate optimizing the efficiency of such turbines. Moreover, engine performance may be improved, for example, by operating the forward fan at a higher fan pressure ratio and/or higher rotational speed than the aft fan. However, operating the aft fan at a lower fan speed and/or a lower fan pressure ratio may cause booster stages that are driven off the aft fan to operate below a peak efficiency and/or reduce the performance of the low-pressure turbine driving the aft fan.

BRIEF DESCRIPTION OF THE FIGURES

In one aspect, a method for assembling a gas turbine engine is provided. The method includes providing a first fan assembly including a plurality of rotor blades that are configured to rotate in a first rotational direction at a first rotational speed, rotatably coupling a second fan assembly axially aft of the first fan assembly, wherein the second fan assembly includes a plurality of rotor blades that are configured to rotate in a second rotational direction, and coupling a gearbox to the second fan assembly that is configured to rotate the second fan assembly at a second rotational speed that is different than the first rotational speed.

In another aspect, a fan assembly is provided. The fan assembly includes a first fan assembly comprising a plurality of rotor blades configured to rotate in a first rotational direction and at a first rotational speed, a second fan assembly including a plurality of rotor blades configured to rotate in a second rotational direction, wherein the second fan assembly is coupled axially aft of the first fan assembly, and a gearbox coupled to the second fan assembly, the gearbox is configured to rotate the second fan assembly at a second rotational speed that is different than the first rotational speed.

In a further aspect, a gas turbine engine is provided. The gas turbine engine includes a first fan assembly comprising a plurality of rotor blades configured to rotate in a first rotational direction and at a first rotational speed, a second fan assembly including a plurality of rotor blades configured to rotate in a second rotational direction, wherein the second fan assembly is coupled axially aft of the first fan assembly, and a gearbox coupled to the second fan assembly, the gearbox is configured to rotate the second fan assembly at a second rotational speed that is different than the first rotational speed.

BRIEF DESCRIPTION OF THE DRAWINGS

Figure 1:
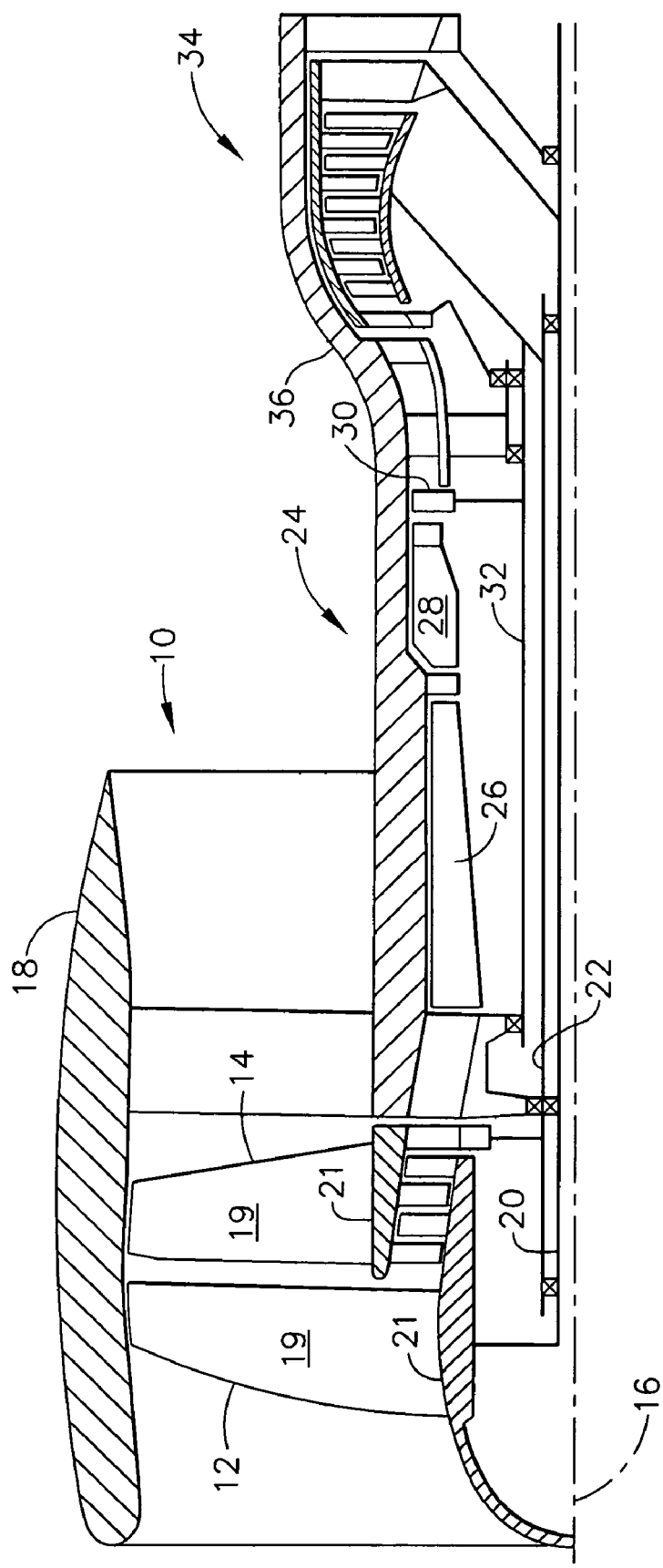
Figure 2:
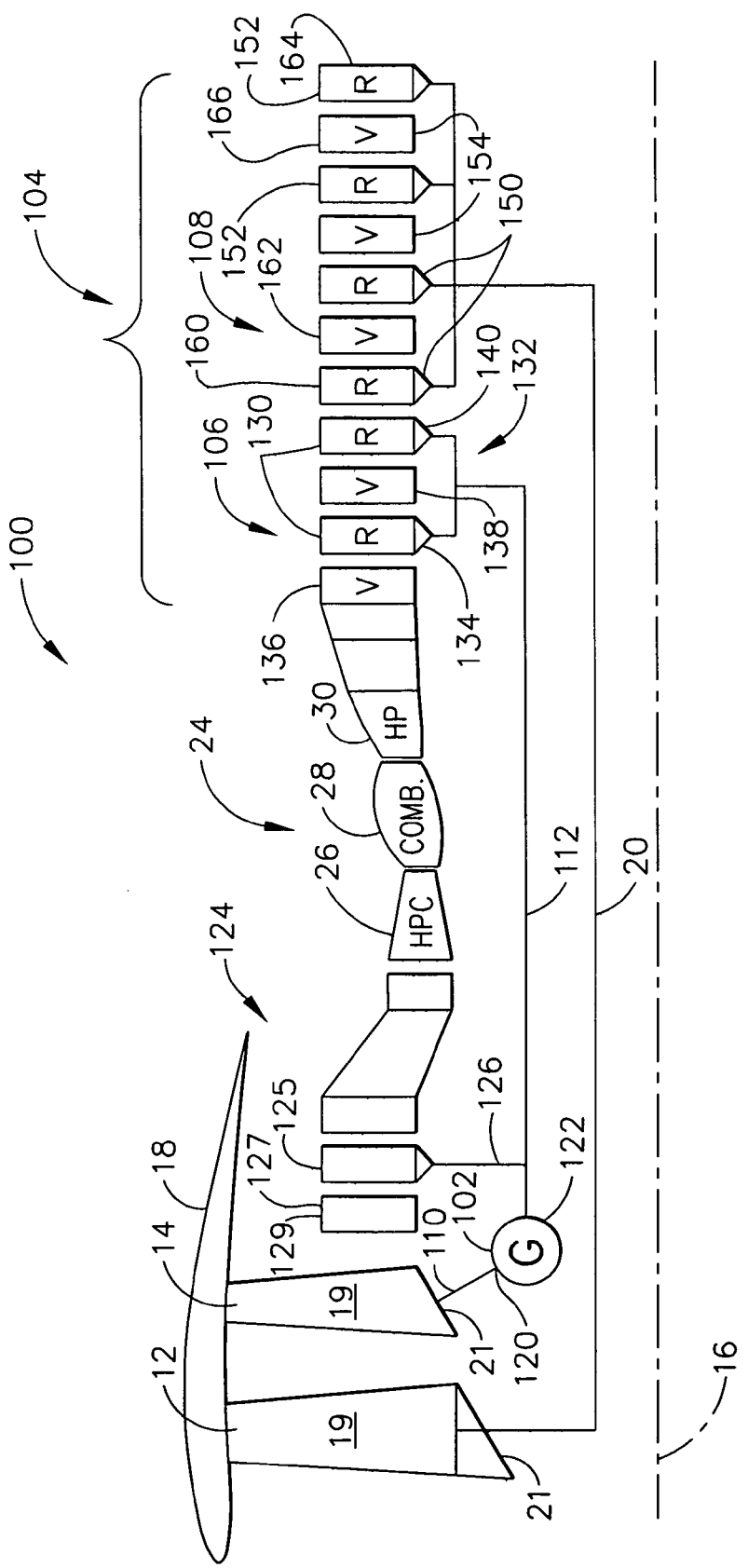
Figure 3:
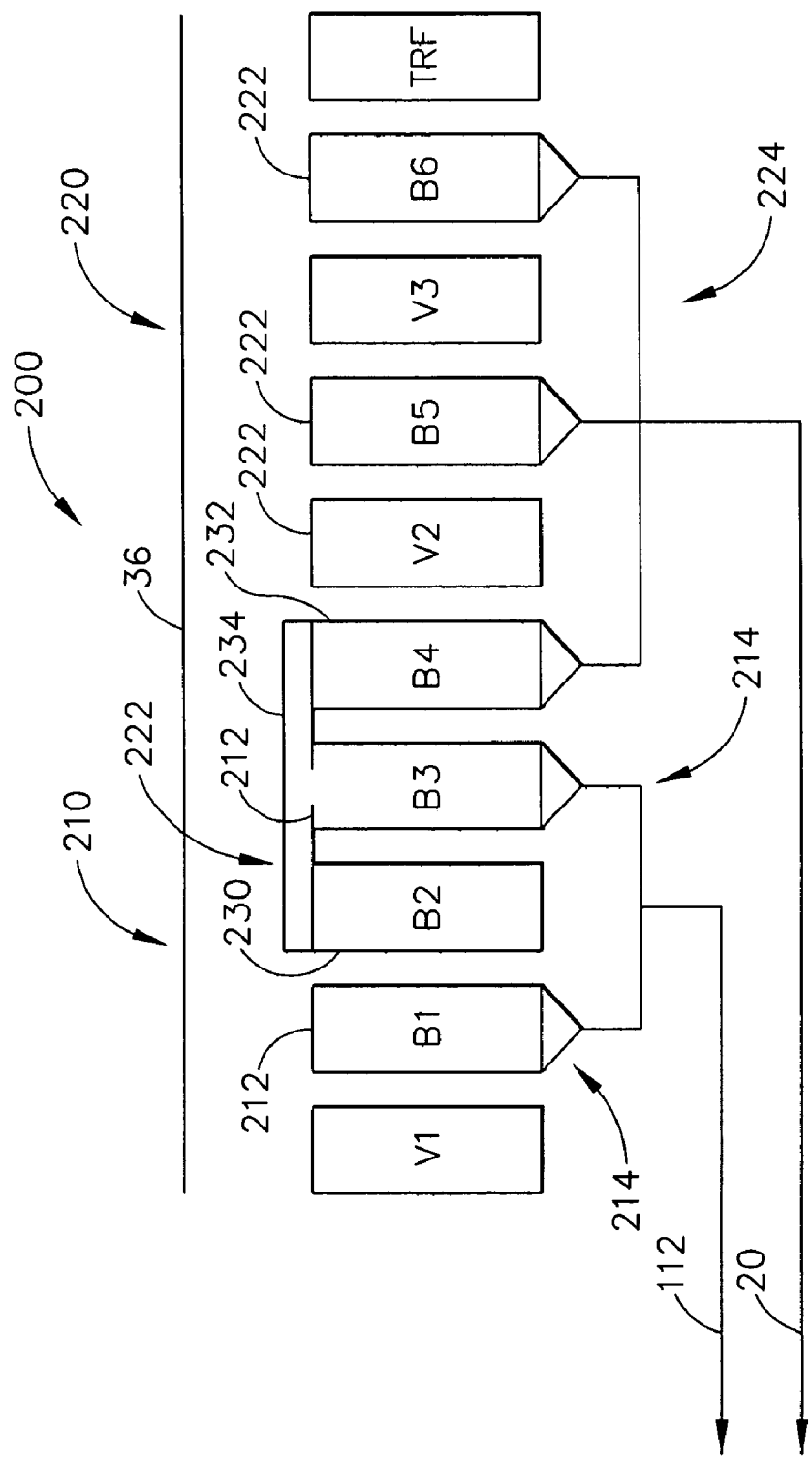

FIG. 1 is a cross-sectional view of a portion of an exemplary gas turbine engine;

FIG. 2 is a schematic diagram of an exemplary gas turbine engine that includes a gear assembly; and FIG. 3 is a schematic diagram of an exemplary counter-rotating low-pressure turbine that can be used with the gas turbine engine shown in FIG. 2.

DETAILED DESCRIPTION OF THE INVENTION

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of rotor blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

FIG. 2 is a schematic diagram of an exemplary gas turbine engine 100 that includes a gearbox assembly 102 and a counter-rotating low-pressure turbine 104. Turbine 104 includes a first turbine rotor 106 and a second turbine rotor 108. In the exemplary embodiment, gas turbine engine 100 is substantially similar to gas turbine engine 10 (shown in FIG. 1), and components of gas turbine engine 100 that are identical to components of gas turbine engine 10 are identified in FIG. 2 using the same reference numerals used in FIG. 1.

Gas turbine engine 100 includes forward fan assembly 12 and aft fan assembly 14 disposed about longitudinal centerline axis 16. Fan assemblies 12 and 14 each include plurality of rows of rotor blades 19 positioned within nacelle 18. Blades 19 are coupled to respective rotor disks 21. Gas turbine engine 100 also includes core engine 24 that is downstream from fan assemblies 12 and 14. Core engine 24 includes high-pressure compressor (HPC) 26, combustor 28, and high-pressure turbine (HPT) 30 that is coupled to HPC 26 via core rotor or shaft 32 (shown in FIG. 1).

In the exemplary embodiment, gas turbine engine 100 includes first shaft 110 that rotatably couples aft fan 14 to gearbox assembly 102, a second shaft 112 that rotatably couples gearbox assembly 102 to first turbine rotor 106, and third shaft 20 that rotatably couples forward fan 12 to a second turbine rotor 108. More specifically, gearbox assembly 102 includes a forward end 120 that is coupled to aft fan assembly 14 using shaft 110, and an aft end 122 that is coupled to first turbine rotor 106 using shaft 112. In one embodiment, gearbox assembly 102 has a gear ratio of between approximately 2.5 to 1 and approximately 4.5 to 1. In the exemplary embodiment, gearbox assembly 102 has a gear ratio of approximately 3.5 to 1 such that first turbine rotor 106 rotates at a rotational speed that is approximately 3.5 times the rotational speed of aft fan 14. In one embodiment, forward fan assembly 12 rotates at a rotational speed that is between approximately 0.9 and 2.1 times the rotational speed of aft fan assembly 14 in the opposite rotational direction. In the exemplary embodiment, forward fan assembly 12 rotates at a rotational speed that is approximately 1.5 times the rotational speed of aft fan assembly 14 in the opposite rotational direction. Accordingly, in one embodiment, forward fan assembly 12 rotates at a rotational speed that is greater than the rotational speed of aft fan assembly 14, and in an alternative embodiment, forward fan assembly 12 rotates at a rotational speed that is less than the rotational speed of aft fan assembly 14.

Gas turbine engine 100 also includes a booster compressor 124 that is coupled to shaft 112. In the exemplary embodiment, booster compressor 124 includes at least one row of rotor blades 125 that are coupled to a respective rotor disk 126. In the exemplary embodiment, booster compressor 124 is positioned axially aft of an inlet guide vane 127 and rotates at a rotational speed that is substantially equal to a rotational speed of first turbine rotor 106. Although booster compressor 124 is shown having a single row of rotor blades 125, it should be realized that booster compressor 124 may have a plurality of rows of rotor blades 125 that are interdigitated with a plurality of inlet guide vanes 127. In one embodiment, inlet guide vanes 127 are fixedly coupled to a booster case 129. In another embodiment, rotor blades 125 are rotatably coupled to rotor disk 126 such that inlet guide vanes 127 are movable during engine operation to facilitate varying a quantity of air channeled through booster compressor 124.

In the exemplary embodiment, low-pressure turbine first rotor 106 is positioned axially forward of low-pressure turbine rotor 108. Turbine rotor 106 includes a plurality of circumferentially-spaced rotor blades 130 that extend radially outwardly. Blades 130 are arranged in axially-spaced rows of turbine blades 132. Although, the exemplary embodiment illustrates only two rows of turbine blades 132, it should be realized that first turbine rotor 106 may have any quantity of rows of turbine blades 132 without affecting the scope of the method and apparatus described herein. More specifically, first turbine rotor 106 includes a first row 134 that is positioned axially aft of a first vane 136 and axially forward of a second vane 138, and a second row 140 that is positioned axially aft of second vane 138. More specifically, first turbine rotor 106 includes a plurality of rows of turbine blades 132 that are interdigitated with a plurality of vanes 136 and 138, for example. In the exemplary embodiment, first turbine rotor 106 rotates in a first rotational direction. During operation, combustion air is channeled from high-pressure turbine 30 through vane 136, first row 134, second vane 138, and through second row 140. The combustion air that is discharged from second row 140 is then channeled to second turbine rotor 108.

In the exemplary embodiment, second turbine rotor 108 is positioned axially aft of first turbine rotor 106 and configured to rotate in a second rotational direction that is opposite the first rotational direction of first turbine rotor 106. Second turbine rotor 108 includes a plurality of circumferentially-spaced rotor blades 150 that extend radially outwardly. Blades 150 are arranged in axially-spaced rows of turbine blades 152. Although, the exemplary embodiment illustrates only four rows of turbine blades 152, it should be realized that second turbine rotor 108 may have any quantity of rows of turbine blades 152 without affecting the scope of the method and apparatus described herein. In the exemplary embodiment, plurality of rows of turbine blades 152 are interdigitated with a plurality of vanes 154. More specifically, second turbine rotor 108 includes a first row of turbine blades 160 that is positioned axially aft of turbine blade row 140 and axially forward of a vane 162, and a second row of turbine blades 164 that is positioned axially aft of a second vane 166 such that plurality of rows of turbine blades 152 straddle plurality of vanes 154. In the exemplary embodiment, at least one row of turbine blades 152 is positioned axially forward of a plurality of vanes 154, and at least one row of turbine blades 152 is positioned axially aft of plurality of vanes 154 such that rotor 108 straddles plurality of vanes 154.

During operation, forward fan assembly 12 is operably coupled to second turbine rotor 108, and aft fan assembly is operably coupled to first turbine rotor 106 through gearbox assembly 102 such that aft fan assembly 14 operates at a lower rotational speed than forward fan assembly 12 to facilitate increasing total fan pressure ratios. Moreover, coupling fan assembly 14 to gearbox assembly 102 to a lower a rotational speed of fan assembly 14 facilitates reducing a diameter of fan assemblies 12 and 14 compared to known gas turbine engines fan assemblies while also significantly reducing engine noise.

More specifically, during assembly, aft fan assembly 14 is matched with high performance booster 124 and first turbine rotor 106 using gearbox assembly 102. Gearbox assembly 102 has a gear ratio of between approximately 2.5 to 1 and approximately 4.5 to 1 to facilitate enabling relatively small, high speed, one or two stage boosters 124, and/or a low-pressure turbine that includes one or two low-pressure turbine stages 134 to be utilized within gas turbine engine 10. Moreover, booster assembly 124 is coupled between aft fan assembly 14 and core engine 24 such that booster assembly 124 is not nested, i.e. interdigitatedly driven by both fans as accomplished in known gas turbine engines. Since gearbox assembly 102 drives only aft fan assembly 14, the gearbox horsepower required to drive aft fan assembly is also reduced, thus a size of gearbox assembly 102 can be reduced. Moreover, the quantity of rows of turbine blades required to drive aft fan assembly 14 can be reduced by several stages compared to known gas turbine engines.

FIG. 3 is a schematic diagram of a straddle-mounted counter-rotating low-pressure turbine assembly 200 that may be used with a gas turbine engine similar to gas turbine engine 100 (shown in FIG. 2). In the exemplary embodiment, low-pressure turbine 200 includes a stationary outer casing 36 that is coupled to core engine 24 (shown in FIG. 2) downstream from high-pressure turbine 30 (shown in FIG. 2).

Low-pressure turbine 200 includes a first rotor 210 that has a generally frusto-conical shape and includes a plurality of circumferentially-spaced rotor blades 212 that extend radially outwardly. Blades 212 are arranged in axially-spaced rows of blades 214. Although, the exemplary embodiment illustrates only two rows of blades 214, it should be realized that first rotor 210 may have any quantity of rows of blades 214 without affecting the scope of the method and apparatus described herein. More specifically, first rotor 210, in the exemplary embodiment, includes M rows of turbine blades 214 and is rotatably coupled to gearbox assembly 102 (shown in FIG. 2) via shaft 112.

Low-pressure turbine 200 also includes a second rotor 220 that includes a plurality of circumferentially-spaced rotor blades 222 that extend radially outwardly. Blades 222 are arranged in axially-spaced rows of blades 224. Although, the exemplary embodiment illustrates only four rows of blades 224, it should be realized that second rotor 220 may have any quantity of rows of blades 224 without affecting the scope of the method and apparatus described herein. More specifically, in the exemplary embodiment, second rotor 220 includes N rows of turbine blades 224, wherein N is greater than M. Second rotor 220 is rotatably coupled to forward fan assembly 12 (shown in FIG. 2) via shaft 20.

In the exemplary embodiment, at least one of the plurality of rows of turbine blades 224 is coupled axially forward of at least one of the plurality of rows of turbine blades 214. More specifically, second rotor 220 includes a first row of turbine blades 230 that is coupled to a second row of turbine blades 232 utilizing a connecting member 234. In the exemplary embodiment, at least one row of turbine blades 230 is positioned between two adjacent rows of turbine blades 214 such that at least a portion of second rotor 220 is interdigitated with at least a portion of first rotor 210.

During operation, forward fan assembly 12 is rotatably coupled to second turbine rotor 108, and aft fan assembly is rotatably coupled to first turbine rotor 106 through gearbox assembly 102 such that aft fan assembly 14 operates with a lower rotational speed than forward fan assembly 12. The lower rotational speed of aft fan assembly 14 facilitates increasing total fan pressure ratios while utilizing fan assemblies 12 and 14 that have smaller fan diameters than known gas turbine engines fan assemblies. Moreover, the combination of the reduced rotational speed and the small diameters of fan assemblies 12 and 14 facilitates significantly reducing engine noise in comparison to known gas turbine engines. The overall size of low-pressure turbine 200 can be reduced by several stages and is not nested compared to known low pressure turbines. Moreover, aft fan assembly 14 is coupled to gearbox assembly 102 to facilitate utilizing a tandem low-pressure turbine that is lighter in weight compared to a known five stage nested counter-rotating low pressure turbine. Additionally, gas turbine engines 100 and 200 each include a booster compressor that facilitates speed match control at all power settings.

The gas turbine engines described herein include a counter-rotating low-pressure turbine that includes a smaller diameter to facilitate reducing the weight of the gas turbine engine. Since the low-pressure turbines described herein have a smaller diameter, the turbine mid-frame can be shortened. Moreover, the low-pressure turbines described herein do not require a rotating frame structure or disks in the outer flowpath. Additionally, seals currently required in at least some known low-pressure turbine outer cases can be eliminated as the quantity of air required to cool the low-pressure turbine structure can be reduced.

Exemplary embodiments of a gas turbine engine that includes a gearbox coupled to a fan assembly are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a first fan assembly including a plurality of rotor blades that are configured to rotate in a first rotational direction at a first rotational speed;
   coupling the first fan assembly to a first turbine rotor;
   rotatably coupling a second fan assembly axially aft of the first fan assembly, wherein the second fan assembly includes a plurality of rotor blades that are configured to rotate in a second rotational direction;
   coupling the second fan assembly to a second turbine rotor that is axially forward from the first turbine rotor; and
   coupling a gearbox to the second fan assembly that is configured to rotate the second fan assembly at a second rotational speed that is different than the first rotational speed such that the gearbox is coupled between the second fan assembly and the second turbine rotor.

2. A method in accordance with claim 1 wherein coupling a gearbox to the second fan assembly further comprises using a gearbox coupled to the fan assembly that has a gear ratio that is approximately equal to 3.5 to 1.

3. A method in accordance with claim 1 wherein coupling a gearbox to the second fan assembly further comprises coupling the gearbox to the second fan assembly such that the second fan assembly rotates at a second rotational speed that is less than the first rotational speed.

4. A method in accordance with claim 1 wherein:
   coupling the first fan assembly further comprises coupling the fan assembly to a first turbine rotor that includes a first plurality of rows of turbine blades to the first fan assembly; and
   coupling the second fan assembly to a second turbine rotor that includes a second plurality of rows of turbine blades that is different than the first plurality of rows of turbine blades.

5. A method in accordance with claim 1 wherein:
   coupling the first fan assembly further comprises coupling the fan assembly to a first turbine rotor that includes a first plurality of rows of turbine blades; and
   coupling the second fan assembly to a second turbine rotor that includes a second plurality of rows of turbine blades, wherein at least one of the first plurality of rows of turbine blades is coupled axially forward of at least one of the second plurality of rows of turbine blades.

6. A fan assembly comprising:
   a first fan assembly comprising a plurality of rotor blades configured to rotate in a first rotational direction and at a first rotational speed;
   a first turbine coupled to said first fan assembly;
   a second fan assembly comprising a plurality of rotor blades configured to rotate in a second rotational direction, wherein said second fan assembly is coupled axially aft of said first fan assembly;

a second turbine coupled to said second fan assembly such that said second turbine is positioned axially forward of said first turbine; and a gearbox coupled to said second fan assembly such that said gearbox is coupled between said second fan assembly and said second turbine, said gearbox configured to rotate said second fan assembly at a second rotational speed that is different than said first rotational speed.

7. A fan assembly in accordance with claim 6 wherein said gearbox has a gear ratio that is approximately equal to 3.5 to 1.

8. A fan assembly in accordance with claim 6 wherein said second rotational speed is less than said first rotational speed.

9. A fan assembly in accordance with claim 6 wherein said first turbine rotor comprises a first plurality of rows of turbine blades, said second turbine rotor comprises a second plurality of rows of turbine blades that is different than the first plurality of rows of turbine blades.

10. A fan assembly in accordance with claim 9 wherein at least one of said first plurality of rows of turbine blades is coupled upstream from at least one of said second plurality of rows of turbine blades.

11. A gas turbine engine comprising:
a first fan assembly comprising a plurality of rotor blades configured to rotate in a first rotational direction and at a first rotational speed;
a first low pressure turbine rotor that is coupled to said first fan assembly;
a second fan assembly comprising a plurality of rotor blades configured to rotate in a second rotational direction, wherein said second fan assembly is coupled axially aft of said first fan assembly;
a second low-pressure turbine rotor that is coupled to said gearbox, at least a portion of said second turbine rotor is positioned upstream from at least a portion of said first turbine rotor; and
a gearbox coupled to said second fan assembly, said gearbox configured to rotate said second fan at a second rotational speed that is different than the first rotational speed.

12. A gas turbine engine in accordance with claim 11 wherein said gearbox has a gear ratio that is approximately equal to 3.5 to 1 such that the second rotational speed is less than the first rotational speed.

13. A gas turbine engine in accordance with claim 11 further comprising:
a shaft coupled between said second fan assembly and said second turbine rotor, and
a booster compressor coupled to said shaft, said booster compressor coupled between said second fan assembly and said second turbine rotor.

14. A gas turbine engine in accordance with claim 11 wherein said first turbine rotor comprises a first plurality of rows of turbine blades, said second turbine rotor comprises a second plurality of rows of turbine blades that is different than said first plurality of rows of turbine blades.

15. A gas turbine engine in accordance with claim 14 wherein at least one of said first plurality of rows of turbine blades is coupled upstream from at least one of said second plurality of rows of turbine blades.

* * * * *